(12) United States Patent
Bhat et al.

(10) Patent No.: US 9,294,523 B2
(45) Date of Patent: Mar. 22, 2016

(54) AUTOMATIC FUTURE MEETING SCHEDULER BASED UPON LOCATIONS OF MEETING PARTICIPANTS

(71) Applicant: Cisco Technology, Inc., San Jose, CA (US)

(72) Inventors: Raghurama Bhat, Cupertino, CA (US); Joseph Khouri, San Jose, CA (US); Biren Gandhi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 283 days.

(21) Appl. No.: 13/769,990

(22) Filed: Feb. 19, 2013

(65) Prior Publication Data
US 2014/0237041 A1  Aug. 21, 2014

(51) Int. Cl.
*H04L 29/06* (2006.01)
*H04L 29/08* (2006.01)

(52) U.S. Cl.
CPC .......... *H04L 65/403* (2013.01); *H04L 65/1069* (2013.01); *H04L 67/18* (2013.01)

(58) Field of Classification Search
CPC ............ G06Q 10/109; G06Q 10/1093; G06Q 10/1095; H04L 12/1818; H04L 65/403; H04L 65/1069; H04L 67/18; H04M 3/42348; H04M 3/42365; H04M 3/42374; H04M 3/56; H04M 3/562; H04M 3/565
See application file for complete search history.

(56) References Cited

U.S. PATENT DOCUMENTS

| | | | |
|---|---|---|---|
| 7,149,810 B1 | 12/2006 | Miller et al. | |
| 7,876,714 B2 | 1/2011 | Ethier et al. | |
| 8,286,183 B2 | 10/2012 | Baird et al. | |
| 2002/0140733 A1* | 10/2002 | Edlund et al. | 345/764 |
| 2005/0047582 A1 | 3/2005 | Shaffer et al. | |
| 2005/0114191 A1* | 5/2005 | Atkin et al. | 705/8 |
| 2005/0256754 A1* | 11/2005 | Nastacio | 705/8 |
| 2006/0224430 A1 | 10/2006 | Butt | |
| 2007/0005409 A1* | 1/2007 | Boss et al. | 705/8 |
| 2007/0094661 A1 | 4/2007 | Baird et al. | |
| 2007/0115348 A1 | 5/2007 | Eppel et al. | |
| 2007/0116226 A1* | 5/2007 | Bennett et al. | 379/202.01 |
| 2008/0040189 A1 | 2/2008 | Tong et al. | |
| 2008/0109517 A1 | 5/2008 | Sarkar et al. | |
| 2008/0195312 A1* | 8/2008 | Aaron et al. | 701/209 |
| 2010/0192162 A1 | 7/2010 | Conner et al. | |

(Continued)

OTHER PUBLICATIONS http://www.mobiletechworld.com/2011/08/18/microsoft-releases-location-based-meeting-application-for-windows-phone-7/, downloaded Dec. 10, 2012.

(Continued)

*Primary Examiner* — Brian J Gillis
*Assistant Examiner* — Gil H. Lee
(74) *Attorney, Agent, or Firm* — Lempia Summerfield Katz LLC

(57) ABSTRACT

In a network that supports communications between client devices and at least one meeting server, a meeting request that includes one or more meeting constraints to be satisfied is monitored prior to scheduling or initiating a meeting between a plurality of meeting participants associated with respective client devices. At least one meeting constraint includes a location constraint that identifies a location for a client device associated with a meeting participant prior to scheduling or initiating the meeting. In response to each meeting constraint being satisfied, including the at least one location constraint, the meeting is automatically scheduled or initiated for the participants via the meeting server.

17 Claims, 8 Drawing Sheets

TIME: 3PM EST

| MEETING PARTICIPANT | CRITERIA 1 | CRITERIA 2 | CRITERIA 3 NONE | ALL CRITERIA MET? |
|---|---|---|---|---|
| SUE | ARRIVE AT HOME | PRESENCE STATUS AVAILABLE | NONE | NO |
| DAVE | ARRIVE AT HOME | PRESENCE STATUS AVAILABLE | NONE | NO |
| PAM | FLIGHT LANDS IN GERMANY | ARRIVE AT HOTEL & WAIT 1 HOUR | PRESENCE STATUS AVAILABLE | NO |
| JOE | PRESENCE STATUS AVAILABLE | NONE | NONE | YES |

140

(56) References Cited

U.S. PATENT DOCUMENTS

2011/0022968 A1 1/2011 Conner et al.
2011/0135079 A1 6/2011 Shah et al.
2012/0142324 A1* 6/2012 Kim et al. .................... 455/416
2013/0002805 A1 1/2013 Andresen et al.

OTHER PUBLICATIONS

Hyoungtae Cho, "Coinonia: Privacy-Aware Meeting Scheduler based on Location-Based Services for Mobile Users", University of Maryland, Scholarly Paper Archive—Department of Computer Science, Feb. 6, 2013 (pp. 1-6).
Kenny Qili Zhu et al, "A Meeting Scheduling System Based on Open Constraint Programming", Department of Computer Science, National University of Singapore, Republic of Singapore, A. Banks Pidduck et al. (Eds.): CAISE 2002, LNCS 2348, pp. 792-796, 2002.
Richard J. Wallace et al., "Constraint-Based Multi-Agent Meeting Scheduling: Effects of Agent Heterogeneity on Performance and Privacy Loss", Cork Constraint Computation Center University College Cork, Cork, Ireland, 2002, (7 pages).

* cited by examiner

TIME: 3PM EST

140

| MEETING PARTICIPANT | CRITERIA 1 | CRITERIA 2 | CRITERIA 3 NONE | ALL CRITERIA MET? |
|---|---|---|---|---|
| SUE | ARRIVE AT HOME | PRESENCE STATUS AVAILABLE | NONE | NO |
| DAVE | ARRIVE AT HOME | PRESENCE STATUS AVAILABLE | NONE | NO |
| PAM | FLIGHT LANDS IN GERMANY | ARRIVE AT HOTEL & WAIT 1 HOUR | PRESENCE STATUS AVAILABLE | NO |
| JOE | PRESENCE STATUS AVAILABLE | NONE | NONE | YES |

FIG.6A

TIME: 5PM EST

— 140

| MEETING PARTICIPANT | CRITERIA 1 | CRITERIA 2 | CRITERIA 3 NONE | ALL CRITERIA MET? |
|---|---|---|---|---|
| SUE | ARRIVE AT HOME | PRESENCE STATUS AVAILABLE | NONE | YES |
| DAVE | ARRIVE AT HOME | PRESENCE STATUS AVAILABLE | NONE | YES |
| PAM | FLIGHT LANDS IN GERMANY | ARRIVE AT HOTEL & WAIT 1 HOUR | PRESENCE STATUS AVAILABLE | NO |
| JOE | PRESENCE STATUS AVAILABLE | NONE | NONE | YES |

FIG.6B

TIME: 6PM EST

| MEETING PARTICIPANT | CRITERIA 1 | CRITERIA 2 | CRITERIA 3 NONE | ALL CRITERIA MET? |
|---|---|---|---|---|
| SUE | ARRIVE AT HOME | PRESENCE STATUS AVAILABLE | NONE | YES |
| DAVE | ARRIVE AT HOME | PRESENCE STATUS AVAILABLE | NONE | YES |
| PAM | FLIGHT LANDS IN GERMANY | ARRIVE AT HOTEL & WAIT 1 HOUR | PRESENCE STATUS AVAILABLE | YES |
| JOE | PRESENCE STATUS AVAILABLE | NONE | NONE | YES |

FIG.6C

AUTOMATIC FUTURE MEETING SCHEDULER BASED UPON LOCATIONS OF MEETING PARTICIPANTS

TECHNICAL FIELD

The present disclosure relates to meeting scheduling.

BACKGROUND

Meeting platforms (e.g., a client/server arrangement) that facilitate scheduling and hosting of meetings with multiple participants via participant computing devices have been in use for some time. Such meeting platforms typically provide participants with the ability, via their computing devices, to schedule, initiate, join and conduct meetings between two or more people.

Meeting platforms have been enhanced over the years to include a number of features, including the usage of presence for participants as well as facilitating audio and/or video meetings between participants distanced from each other at a number of locations. However, despite such enhancements, there can still be difficulties in scheduling a meeting at times based upon the travel schedules of people. For example, it may be desirable to establish a meeting between two or more participants where at least one of the participants is traveling, but the exact time cannot be established until after it is known when the participant has arrived at his or her destination and is available to participate in the meeting.

BRIEF DESCRIPTION OF THE DRAWINGS

FIGS. 6A, 6B and 6C depict examples of a table of participants and constraints associated with each participant, where the constraints are used by the system of FIG. 1 and the example process of FIG. 5 to monitor meeting constraints prior to automatically scheduling or initiating a meeting.

DESCRIPTION OF EXAMPLE EMBODIMENTS

Overview

Techniques are presented herein that pertain to communications between client devices and at least one meeting server. At a meeting server, a meeting request is monitored that includes one or more meeting constraints to be satisfied prior to scheduling or initiating a meeting between a plurality of meeting participants associated with respective client devices. At least one meeting constraint comprises a location constraint that identifies a location for a client device associated with a meeting participant prior to scheduling or initiating the meeting. In response to each meeting constraint being satisfied, including the at least one location constraint, the meeting is automatically scheduled or initiated for the meeting participants via the meeting server.

Example Embodiments

Techniques are described herein for the automatic scheduling or initiation of a meeting between participants based upon certain criteria being established or determined, where at least one of the criteria comprises a participant reaching a location or destination that indicates the user is now available for the meeting.

Figure 1:
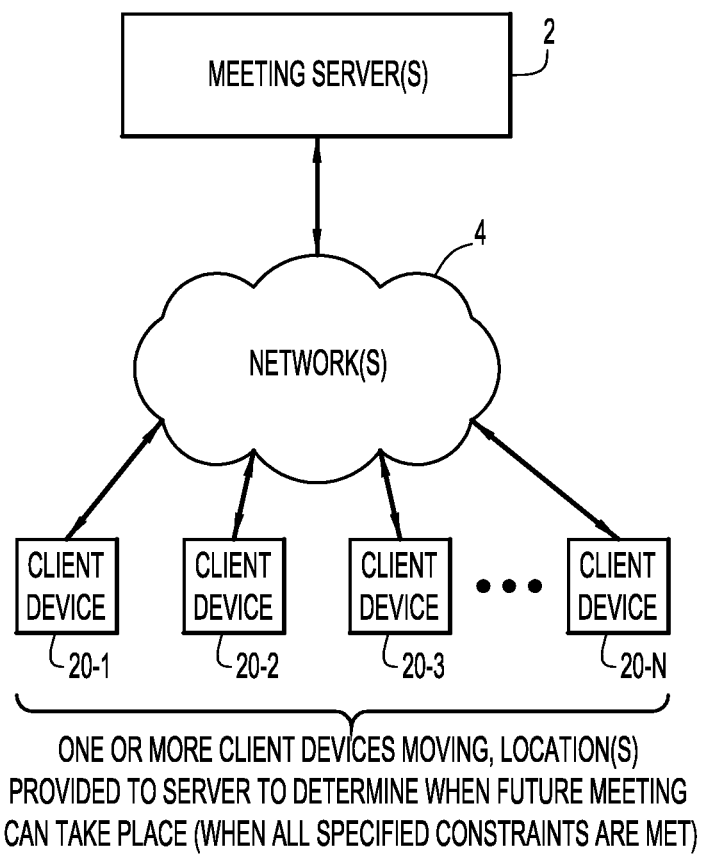
FIG. 1 is a schematic block diagram of an example system that supports a meeting platform between client devices which is hosted by a meeting server.

Meetings presently occur in a number of different environments. With increasing technologies, online meetings can be extended to participants in different locations, with audio and/or video capabilities being provided by computing devices to allow participants to effectively communicate with each other via their computing devices. An online meeting environment that involves computing devices of participants can be enabled in a client/server system such as is depicted in FIG. 1. In particular, the system comprises one or more meeting servers 2 that connect with a plurality of endpoint or client computing devices 20-1, 20-2, 20-3, . . . 20-N (where N can be any suitable number, such as two, three, tens, hundreds, thousands or greater) over one or more networks 4. The network(s) 4 facilitate communications and exchange of communications and content between client devices 20 via the one or more host server devices 2. Examples of types of networks that can be utilized within the system depicted in FIG. 1 include, without limitation, any one or more of local or wide area networks, Internet Protocol (IP) networks such as intranet or internet networks, telephone networks (e.g., public switched telephone networks), wireless or mobile phone or cellular networks, and any suitable combinations thereof.

The meeting server(s) 2 can provide a number of hosting services over the network(s) 4 to client devices 20 to facilitate a wide variety of activities and exchanges of different types of communications and information or content between participants at their client devices 20. Thus, client devices 20 interact with each other, via online meetings or any other forms of communication or exchange of content, through the meeting server(s) 2.

In particular, networking environments are established by client devices 20 connecting with the server device(s) 2. A network platform is established between meeting server(s) 2 and client devices 20 that includes software tools or software application modules and related services that link client devices allowing participants to communicate with each other in a variety of different ways (e.g., via email, instant messaging, audio and/or video conferencing, etc.) and share content (e.g., documents, blogs, or any other types of forms of information) via the platform. The term "tool" is used herein to refer to one or more "application" software functions or sets of functions provided by one or more software applications on a client device and/or hosted on a server device on behalf of a client device. Application modules refer to a set of one or more software applications that provide the software tools used by the client devices and/or server devices. The network platform comprises software applications that perform the various operations and functions associated with communications and exchange of information or content between client devices, including the automatic scheduling and/or initiating of meetings between participants based upon techniques described herein, where the software applications are located on client devices 20, one or more meeting server devices 2, as well as any other computing devices within the network(s) 4. As described herein, and as referenced in FIG. 1, automatic scheduling or initiation of a future meeting can occur based upon meeting certain pre-established constraints, at least one constraint being location of a participant for the meeting who is on the move (where a constraint is met or established upon the participant reaching a particular geographic location).

The network platform that supports meetings between client devices 20 utilizing one or more meeting servers 2 can be configured for use with any suitable commercial or other software products and related services including, without limitation, WebEx Connect (Cisco Systems, Inc.), Microsoft SharePoint (Microsoft Corporation) and LotusLive (IBM Corporation). As previously noted, such platforms, in addition to facilitating audio and/or video meetings between participants utilizing their client devices 20, can also provide other forms of communications as well as exchange of other types of information or content. Meetings that can be supported by the network platform include audio and/or video meetings, such as web conferencing, which can further include a number of features to enhance the meeting, such as white boarding, screen content or desktop sharing by one or more client devices associated with participants of the meeting, and Telepresence features that enhance the audio and/or video components of the web meeting to provide the look and "feel" for participants at separate client devices as if they were meeting in the same room. Examples of other types of communications and exchange of information or content within the network platform include, without limitation, messaging, including sending and receiving of real-time or near real-time messages (e.g., email, calendaring and scheduling, creating/modifying/updating of contact lists, instant messaging, short messaging service or SMS), creating/modifying/updating of groups or communities within the network platform (where communities comprise a group of users sharing one or more common goals or interests, where content within the communities typically relates to such goals or interests), and synchronization and organization of documents or files common to a particular community or group associated with the files (e.g., organization of posted or edited web logs or blogs, wikis, other forms of written ideas and/or notes, etc.).

Figure 2:
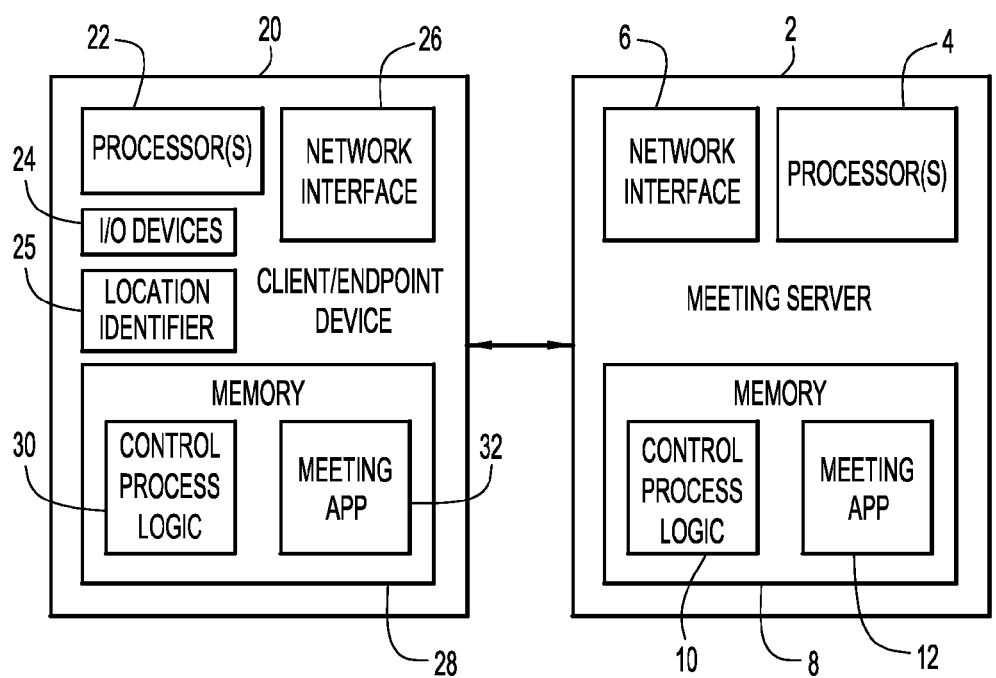
FIG. 2 is a schematic block diagram of an example of a client device connected with a meeting server for the system of FIG. 1.

An example embodiment showing a connection between a client device 20 and a meeting server device 2 via the network 4 for the system shown in FIG. 1 is depicted in FIG. 2. Client device 20 connects (via one or more networks 4) to a host meeting server device 2 to facilitate meetings or other types of communications as well as exchange of information with other client devices 20 associated with participants within the network platform. It is noted that FIG. 2 represents how each client device 20 of the system of FIG. 1 can connect with a meeting server device 2. It is further noted that, while the embodiment of FIG. 2 depicts a connection of a client device 20 with a single server device 2, the system can be configured such that any client device 20 may connect to multiple server devices 2 and further can connect to different server devices 2 depending upon the group of participant/other client devices 2 are to be associated with a particular meeting. Each client device 20 connects via any suitable wireless and/or hard wired connection to meeting server device(s) 2 to facilitate meetings, communications and exchange of information with other client devices 20 over the network.

Each server device 2 includes one or more processors 4, a network interface 6, and a memory 8. Similarly, each client device 20 includes one or more processors 22, a network interface 26, and a memory 28. Each client device 20 further includes any suitable input and output (I/O) devices (depicted generally as 24 in FIG. 2) that facilitate communications and exchange of information or content between the participant at the client device 20 and other participants at other client devices 20, where example I/O devices include, without limitation, one or more cameras to input or record video content, one or more displays to output or display video content, one or more microphones to input or record audio content, one or more speakers to output audio content, one or more keyboards, mouse devices, etc. for inputting information or content, etc., where the I/O devices can be integrated with a client device 20 or be implemented as peripheral devices that connect in any suitable manner with the client device 20.

Each client device 20 further includes a location identifier 25 that is configured to identify a geographic location of the client device 20 at any given time. The location identifier 25 can utilize any suitable hardware and/or software to provide a general or specific geographic location for the client device 20. For example, the location identifier 25 can comprise a Global Positioning System (GPS) device that includes a transceiver to communicate with other GPS devices to provide a geographic location for the client device 20. Alternatively, or in combination with utilizing GPS technology, the location identifier 25 can utilize any other hardware and/or software technologies, such as cellular radio technologies (e.g., utilizing a cellular device such as a mobile phone or a computing device with cellular radio capabilities), information regarding one or more specific networks to which the client device 20 is currently communicating with (e.g., an Internet Protocol or IP address for the closest server or other computing device to which the client device 20 is currently connecting over a network, where the IP address provides an indication of a particular geographic area in which the server and the client device 20 are physically located), etc., to obtain a physical or geographic location of the client device 20 at any given time.

The network interfaces 6, 26 of the server device 2 and client device 20 can be, for example, one or more of an Ethernet interface card or switch, a modem, a router or any other suitable hardware device that facilitates a wireless and/or hardwire connection over the network 4 with one or more computing devices, where the network interface unit can be integrated within the device or a peripheral that connects with the device.

Each of the processors 4, 22 can comprise at least one microprocessor that executes control process logic instructions 10, 30 stored within memory 8, 28 including operational instructions and software applications stored within such memory.

Figure 3:
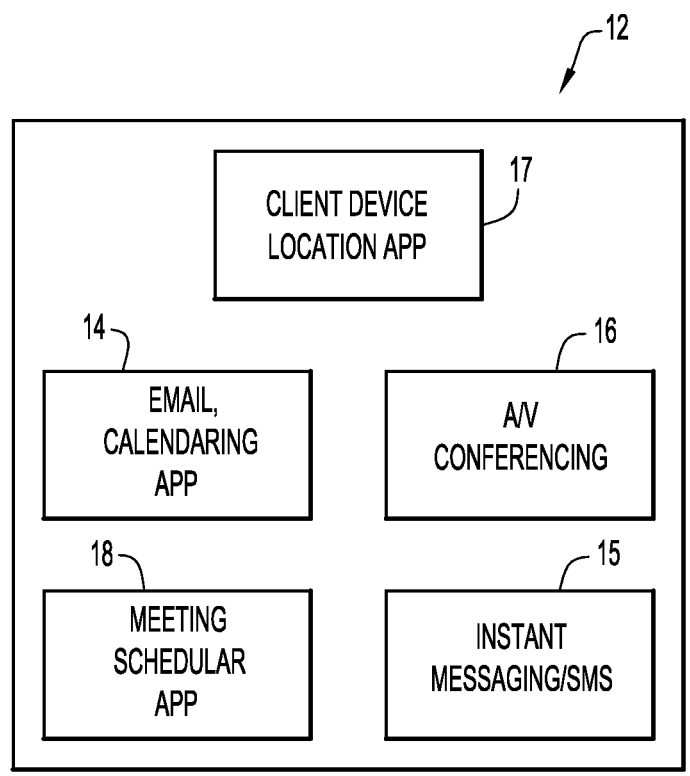
FIG. 3 is an example of a meeting application software application module associated with the meeting server of the system of FIG. 1.

Each meeting server device 2 includes a meeting software application module 12 comprising one or more software applications that provide software tools to facilitate connections of two or more client devices 20 to engage in audio and/or video (A/V) meetings or other types of communications. An example embodiment of a meeting software application module 12 for a meeting server device 2 is depicted in FIG. 3. The meeting software application module 12 includes software applications that facilitate hosting functions for A/V meetings as well as various other types of communications and exchanges of content between client devices 20 via the network platform, including messaging application(s) 14 (e.g., email, calendaring and scheduling, etc.), instant messaging or SMS application(s) 15, meeting application(s) 16 that facilitate audio and/or video meeting conferences between client devices 20 within the platform (including desktop sharing of content from one or more client endpoint devices within the session), and client device location application(s) 17 that store information relating to locations of devices, including past and present locations. The module 12 further includes one or more meeting scheduler applications 18 that facilitate the establishing of a future meeting between client devices 20 based upon predefined constraints, the monitoring of one or more locations associated with one or more client devices 20, the monitoring of the predefined constraints associated with client devices 20 to determine when such constraints are established or met, and the automatic scheduling and/or initiation of the meeting based upon some or all of the constraints being met in accordance with techniques described herein.

Figure 4:
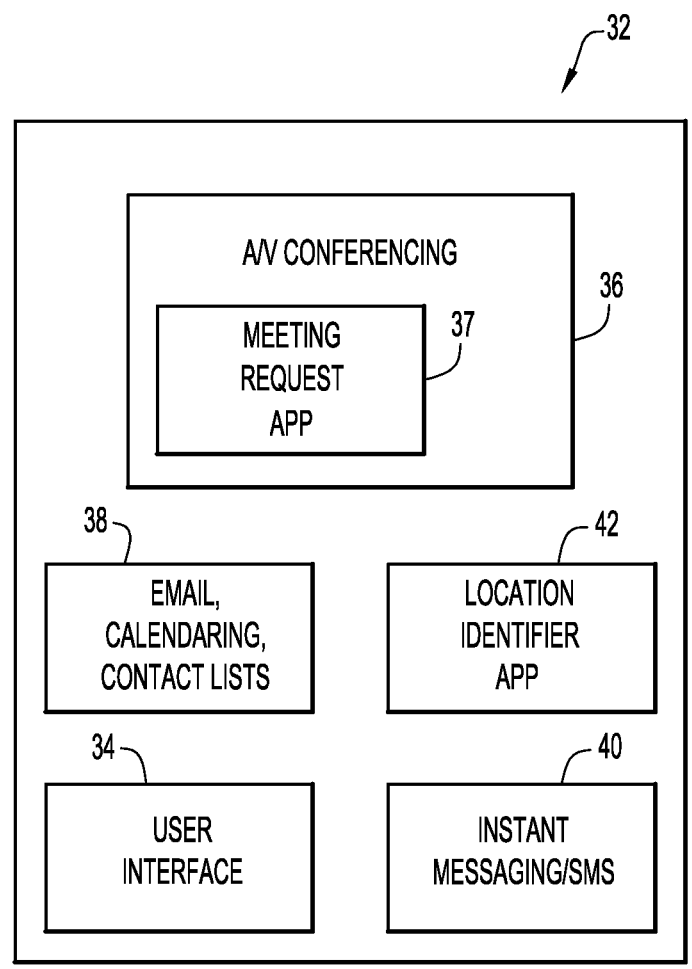
FIG. 4 is a schematic block diagram of an example of a meeting software application module associated with a client device of the system of FIG. 1.

The memory 28 of each client device 20 also includes a meeting application module 32. An example embodiment of the meeting application module 32 is depicted in FIG. 4. The module 32 includes software applications that facilitate various types of communications via the network platform, such as one or more A/V conferencing applications 36 to facilitate online meetings for the client device (hosted by one or more meeting servers 2), including sharing of content during the meeting (e.g., desktop sharing), email messaging application(s) 38 (including, e.g., calendaring and scheduling, contact lists, etc.), and instant messaging or SMS application(s) 40. The A/V conferencing applications 36 include one or more meeting request applications 37 that allow one or more people to input constraint criteria associated with automatically scheduling or initiating a meeting utilizing the techniques described herein. The module 32 also includes one or more applications 34 that provide a user interface for allowing the user to interact with the software and engage in communications and other activities over the network platform. In addition, the module 32 includes one or more location identifier applications 42 that are associated with the location identifier 25 to determine a physical or geographic location of the user and provide such information to the meeting server 2 according to techniques described herein. The location identifier application(s) 42 and the location identifier 25 can be integrated together (e.g., as a single software module), particularly in embodiments in which the location identifier 25 is implemented as one or more software applications and does not include any hardware. Alternatively, the location identifier application(s) 42 can be configured to operate with the location identifier 25 implemented as hardware. For example, in an embodiment in which the location identifier 25 comprises a GPS device, the application(s) 42 are configured to communicate with and/or control the GPS device so as to obtain location information associated with the client device 20 at any given time.

Figure 5:
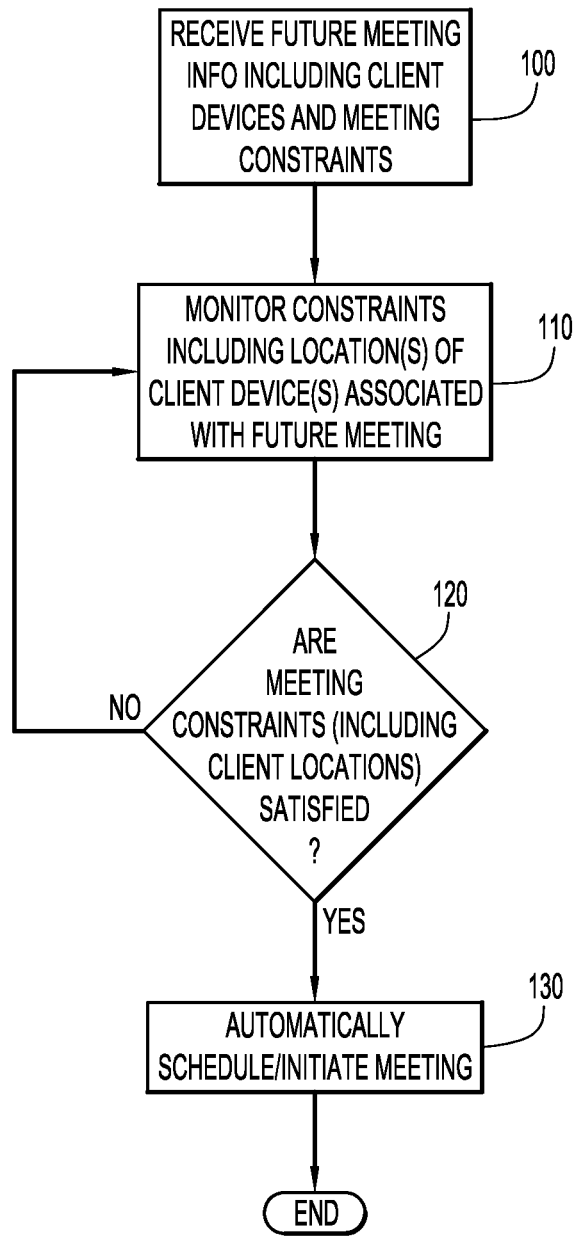
FIG. 5 is a flow chart depicting an example process for automatically scheduling and/or initiating a future meeting based upon client locations and/or other meeting constraints being established for the system of FIG. 1 and utilizing the techniques described herein.

The processors 4 and 22 of the meeting server device(s) 2 and the client devices 20 perform operations in accordance with the steps set forth in the flow chart of FIG. 5 utilizing the meeting application modules 12, 32 as described herein.

The memories 8, 28 may comprise read only memory (ROM), random access memory (RAM), magnetic disk storage media devices, optical storage media devices, flash memory devices, electrical, optical, or other physical/tangible memory storage devices, and any combinations thereof. Each client device 20 include an LCD or any other suitable type of display as part of the I/O devices 24, including touch pad displays (e.g., for tablets, smart phones, or other portable types of computing devices) for display of content by the client device 20.

Some examples of client devices 20 or other computing devices that can be used to engage in meetings or other activities within the network platform for the system of FIG. 1 include, without limitation, stationary (e.g., desktop) computers, personal mobile computer devices such as laptops, note pads, tablets, personal data assistant (PDA) devices, and other portable media player devices, and cell phones (e.g., smartphones) including suitable input and output devices as described above. The computing devices and servers can utilize any suitable operating systems (e.g., Android, Windows, Mac OS, Symbian OS, RIM Blackberry OS, Linux, etc.) to facilitate interaction, activities and sharing of information between computing devices via the platform. Suitable meeting server devices 2 can be any suitable types of stationary or other types of computing devices capable of hosting and managing multiple online meetings or communication sessions of varying types simultaneously as well as receiving, storing and managing content within the network platform.

An example embodiment of a technique for automatically scheduling or initiating a future meeting utilizing the system of FIG. 1 and based upon criteria including one or more locations of meeting participants is now described with reference to the flowchart of FIG. 5.

At 100, the meeting server 2 receives future meeting information including information for the client devices associated with participants and also meeting constraints for one or more participants. One or more meeting participants at one or more client devices 20 can decide that a future meeting is desired, but the meeting is dependent upon at least one participant being at a location or reaching a desired destination first. In an example embodiment, a meeting attendee establishes a meeting request object (via the user interface 34) in which a future online meeting is requested to be managed by the meeting server 2. The meeting participant can also enter the criteria for each of the other participants or, alternatively, the meeting request object can be sent to other meeting attendees at their client devices 20, allowing them to enter their criteria. A criteria table 140 in FIG. 6A shows an example embodiment of four meeting participants (Sue, Dave, Pam, and Joe) with one or more criteria factors associated with at least some of the participants. The data associated with the criteria table is stored at the meeting server device 2. Optionally, this data can also be stored at the client devices 20 for the meeting participants. Not all of the participants need to have any criteria factor, since some meeting participants may be eligible for a meeting anytime (provided their presence status within the network platform indicates they are available). As depicted in the criteria table 140 of FIG. 6A, the only criteria for Joe is that his presence status is available (e.g., he is not on a call or in another meeting). However, the remaining meeting participants have one or more criteria that are not currently met. Other meeting related information (e.g. meeting title, meeting agenda, one or more attachment documents to be provided with the meeting, etc.) can also be associated with the meeting request object in any suitable manner.

At 110, the meeting server 2 (utilizing the one or more client device location applications 17) monitors constraints including locations of one or more client devices associated with the future meeting. Each client device 20 periodically identifies a location utilizing its location identifier 25 and/or location identifier application(s) 42 and provides the location information to the meeting server 2 for assessing criteria constraints associated with the meeting request object. In the example embodiment depicted in FIG. 6A, a criteria for Sue and Dave is that each must arrive at their home prior to the future meeting being automatically scheduled or initiated. Pam is on a flight to Germany, and her criteria is that her flight must arrive in Germany, and she must also arrive at her hotel and wait one hour before her criteria are met. At the current time (3 pm EST), Sue, Dave and Pam do not have all their criteria met (e.g., Sue and Dave have not yet arrived at home, and Pam has not yet arrived at a particular airport in Germany). For Pam, her client device 20 would send location information as soon as Pam's flight has landed and she is allowed to utilize her computing device 20 (e.g., she could activate her computing device on the airplane after it lands, or after she has exited the plane but is still in the airport).

At 120, the meeting server 2 determines whether all meeting constraints are met. If they are not met, the meeting server 2 continues to monitor meeting constraints of the client devices 20 at 110. For example, referring to FIG. 6B, at a later time (5 pm EST), Sue and Dave are now at home and Pam's flight has arrived in Germany. This location information is provided by the client devices 20 associated with Sue, Dave and Pam to the meeting server 2. However, one last criteria needs to be met, where Pam must arrive at her hotel and wait an hour before the future meeting can be automatically scheduled or initiated by the meeting server 2.

In the event all constraint criteria are met for the meeting participants, the meeting server 2 automatically schedules or initiates the online meeting between all of the meeting participants at 130 and utilizing the meeting scheduler application(s) 18. Referring to FIG. 6C, at a later time (6 pm EST), Pam has arrived at her hotel and it is an hour later such that all criteria constraints are now met. The meeting server 2 can, e.g., analyze the email calendars of the meeting participants and automatically schedule the meeting at a time in the relative near future that satisfies each meeting participant's calendar (e.g., scheduling the online meeting at a time that is open for each meeting participant, as indicated by each meeting participant's calendar). Alternatively, the meeting server 2 can automatically initiate the online meeting by automatically contacting each of the client devices 20 associated the meeting participants and connecting the client devices 20 via the meeting server 2 and/or other meeting servers over the network platform. In the example embodiment, the meeting server 2 automatically establishes a connection between the client devices 20 of Sue, Dave, Pam and Joe after all constraint criteria are determined by the meeting server 2 as being met.

Thus, the techniques described herein facilitate the automatic scheduling and/or initiating of a future meeting based upon constraints of the meeting participants, where at least one constraint of a participant requires the participant to arrive at a location prior to the meeting taking place. By having the meeting server automatically manage and monitor the constraints prior to establishing the meeting, meeting participants do not have to attempt to determine when everyone (including participants who may be currently traveling) is available, which can be a difficult task. Therefore, this alleviates the burden of a meeting participant to remember to schedule a meeting once they arrive or shortly before they arrive at a specified location.

In addition to monitoring meeting constraints (e.g., location constraints) of meeting participants, the meeting server can also monitor the calendars of meeting participants. This will ensure that all the other calendar availability constraints are met as well. For example, in a scenario in which a meeting participant has blocked their calendar for certain times (e.g., in the evening, such as 10 pm-6 am for the time zone in which the meeting participant is located), the calendar constraints can also be met in addition to all location and/or other criteria being fulfilled.

Further, the meeting server, in automatically initiating a meeting, can access meeting participant client device preferences (e.g. meeting participant has availability on video, meeting participant prefers meeting using mobile phone, etc.) in order to ensure that such specific client devices are contacted. As previously noted, automatic initiation of a meeting can occur instantly when all criteria for meeting participants are satisfied or, alternatively, at any selected time interval after such criteria are met (e.g., an hour after all criteria met, a week after all criteria met, etc.).

While the example embodiments described herein are in relation to automatically initiating or scheduling online meetings between meeting participants, the techniques can also be used to automatically establish other types of meetings, including meetings where the meeting participants all meet together in the same physical location.

For example, the meeting server can select meeting participants based upon a determined location of a selected category of possible meeting participants. Consider a scenario in which a meeting request object is set up by a manager within a company in which all other managers currently on site are requested to attend. The client devices associated with the possible meeting participants provide their location information to the meeting server (e.g., based upon a request by the meeting server to the client devices), and the meeting server can then schedule a meeting for all managers determined as being on site (based upon the location information provided by the client devices). The meeting can be set as either a meeting at a physical location within the company building (e.g., a designated meeting room, since the determined meeting participants are all at the same location) or, alternatively, an online meeting utilizing the client devices of the meeting participants. If set as a meeting at a physical location, the meeting participants determined to be on site can be notified of a scheduled meeting by the meeting server in any suitable manner (e.g., via an email communication). The meeting server can also scan the calendars for each meeting participant determined to be at the same location in order to effectively schedule the meeting at a time at which each meeting participant is available (i.e., selecting a time that is open for each meeting participant and there are no apparent schedule conflicts).

In addition, the meeting server, after having automatically scheduled a meeting, can cancel or postpone a meeting in response to one or more meeting participants leaving a location (as determined by the client device associated with each meeting participant). As an example, consider the scenario described in relation to FIGS. 6A-6C and in which the meeting server 2 automatically schedules an online meeting between Sue, Dave, Pam and Joe for 8 pm EST. In response to Sue or Dave leaving their home location prior to the online meeting time, the meeting server 2 can detect this (based upon the client device 20 associated with Sue or Dave, such as a smart phone or a laptop or tablet) and either cancel or re-schedule the meeting.

As noted by the previous examples, location constraints in a meeting request object for meeting participants can be approximate (e.g., location is within a city, a state or a country) or precise (location at a specific address, such as a home or work address).

The above description is intended by way of example only.

What is claimed is:

1. A method comprising:
   in a network that supports communications between client devices and at least one meeting server, monitoring a meeting request at a meeting server, the meeting request including one or more meeting constraints to be satisfied prior to scheduling a meeting between a plurality of meeting participants associated with client devices, wherein at least one meeting constraint comprises a location constraint that identifies a location for a client device associated with a meeting participant prior to scheduling the meeting, wherein the at least one meeting constraint further comprises a time constraint defining a time interval after the location constraint is satisfied such that the meeting cannot occur until after at least the location constraint and the time constraint are satisfied;

monitoring the client device to identify an arrival of the client device at the location;

in response to each meeting constraint being satisfied by the arrival of the client device at the location, automatically scheduling the meeting for the meeting participants via the meeting server; and in response to a change in location of the client device such that the location constraint for the client device is no longer satisfied, automatically canceling or re-scheduling the meeting via the meeting server.

2. The method of claim 1, further comprising:
providing location information from at least one client device to the meeting server.

3. The method of claim 2, wherein the location information is obtained utilizing at least one of a GPS device and a cellular radio device associated with the at least one client device.

4. The method of claim 1, wherein the automatic scheduling of the meeting further comprises:
via the meeting server, automatically connecting each client device associated with a meeting participant to an online meeting.

5. The method of claim 1, wherein the at least one meeting constraint comprises each meeting participant being at a single specified location.

6. The method of claim 1, wherein the automatic scheduling of the meeting further comprises:
reviewing email calendars for each meeting participant to determine times within the calendar at which each meeting participant is available; and
scheduling the meeting at a time at which each meeting participant is determined as being available.

7. An apparatus comprising:
a memory configured to store instructions including one or more applications that support communications between client devices and the apparatus over a network;
a network interface device configured to enable communications over the network; and
a processor configured to execute and control operations of the one or more applications so as to:
monitor a meeting request that includes one or more meeting constraints to be satisfied prior to scheduling a meeting between a plurality of meeting participants associated with client devices, wherein at least one meeting constraint comprises a location constraint that identifies a location for a client device associated with a meeting participant prior to scheduling the meeting, wherein the at least one meeting constraint monitored by the processor further comprises a time constraint defining a time interval after the location constraint is satisfied such that the meeting cannot occur until after at least the location constraint and the time constraint are satisfied;
monitor the client device to identify an arrival of the client device at the location to satisfy the at least one location constraint prior to scheduling the meeting;
in response to each meeting constraint being satisfied, including the at least one location constraint, automatically schedule the meeting for the meeting participants; and
in response to a change in location of the client device such that the location constraint for the client device is no longer satisfied, automatically cancel or re-schedule the meeting.

8. The apparatus of claim 7, wherein the processor is further configured to:
receive location information from at least one client device.

9. The apparatus of claim 7, wherein the processor is configured to automatically schedule the meeting by:
automatically connecting each client device associated with a meeting participant to an online meeting.

10. The apparatus of claim 7, wherein the at least one meeting constraint monitored by the processor further comprises each meeting participant being at a single specified location.

11. The apparatus of claim 7, wherein the processor is configured to automatically schedule the meeting by:
reviewing email calendars for each meeting participant to determine times within the calendar at which each meeting participant is available; and
scheduling the meeting at a time at which each meeting participant is determined as being available.

12. One or more non-transitory computer readable storage media encoded with software comprising computer executable instructions and when the software is executed operable to:
in a network that supports communications between client devices and at least one meeting server, monitor a meeting request at a meeting server, the meeting request including one or more meeting constraints to be satisfied prior to scheduling a future meeting between a plurality of meeting participants associated with client devices, wherein at least one meeting constraint comprises a location constraint that identifies a location for a client device associated with a meeting participant prior to scheduling the future meeting, wherein the at least one meeting constraint monitored by the processor further comprises a time constraint defining a time interval after the location constraint is satisfied such that the meeting cannot occur until after at least the location constraint and the time constraint are satisfied;
monitor the client device to identify an arrival of the client device at the location to satisfy the at least one location constraint prior to scheduling the meeting;
in response to each meeting constraint being satisfied, including the at least one location constraint, automatically schedule the future meeting for the meeting participants via the meeting server; and
in response to a change in location of the client device such that the location constraint for the client device is no longer satisfied, automatically cancel or re-schedule the future meeting via the meeting server.

13. The computer readable storage media of claim 12, wherein the instructions are operable to:
provide location information from at least one client device to the meeting server.

14. The computer readable storage media of claim 13, wherein the instructions are operable to obtain the location information from at least one of a GPS device and a cellular radio device associated with the at least one client device.

15. The computer readable storage media of claim 12, wherein the instructions are further operable to automatically schedule the future meeting by:
via the meeting server, automatically connecting each client device associated with a meeting participant to an online meeting.

16. The computer readable storage media of claim 12, wherein the instructions are further operable to monitor the meeting request based upon at least one meeting constraint comprising each meeting participant being at a single specified location.

17. The computer readable storage media of claim 12, wherein the instructions are further operable to automatically schedule the future meeting by:

reviewing email calendars for each meeting participant to determine times within the calendar at which each meeting participant is available; and scheduling the meeting at a time at which each meeting participant is determined as being available.

\* \* \* \* \*